US012540649B2

United States Patent
Shahin

(10) Patent No.: US 12,540,649 B2
(45) Date of Patent: Feb. 3, 2026

(54) BRAKE PISTON FOR A VEHICLE DISC BRAKE ASSEMBLY HAVING INNER GROOVE FOR STRUCTURAL NOISE DAMPENING

(71) Applicant: HL MANDO CORPORATION, Pyeongtaek (KR)

(72) Inventor: Hatem Shahin, Pfaffenhofen (DE)

(73) Assignee: HL MANDO CORPORATION, Pyeongtaek (KR)

( * ) Notice: Subject to any disclaimer, the term of this patent is extended or adjusted under 35 U.S.C. 154(b) by 392 days.

(21) Appl. No.: 18/180,151

(22) Filed: Mar. 8, 2023

(65) Prior Publication Data

US 2023/0287944 A1    Sep. 14, 2023

(30) Foreign Application Priority Data

Mar. 11, 2022   (DE) .......................... 102022202471.0

(51) Int. Cl.
    *F16D 65/00*     (2006.01)
    *F16D 125/06*    (2012.01)

(52) U.S. Cl.
    CPC ..... *F16D 65/0006* (2013.01); *F16D 65/0068* (2013.01); *F16D 2125/06* (2013.01); *F16D 2300/22* (2013.01)

(58) Field of Classification Search
    CPC ............. F16D 65/0006; F16D 65/0068; F16D 2125/06; F16D 2300/22
    USPC ......... 188/72.4, 264 G; 92/212, 248
    See application file for complete search history.

(56) References Cited

U.S. PATENT DOCUMENTS

| | | | | |
|---|---|---|---|---|
| 4,170,926 A | * | 10/1979 | Emmett | F16D 65/14 92/212 |
| 5,826,686 A | * | 10/1998 | Rike | F16D 55/228 188/73.1 |
| 6,146,727 A | * | 11/2000 | Dannels | C08J 5/12 188/264 G |
| 6,170,620 B1 | | 1/2001 | Akita | |
| 6,443,048 B1 | * | 9/2002 | Fischbach | F16J 1/006 92/248 |
| 6,443,049 B2 | * | 9/2002 | Suga | F16J 1/006 92/248 |
| 6,729,445 B1 | | 5/2004 | Qian | |

(Continued)

FOREIGN PATENT DOCUMENTS

DE    1214949 B    4/1966
DE    4328836 A1   3/1995

(Continued)

OTHER PUBLICATIONS

DE Office Action dated Nov. 4, 2022.
DE OA dated Nov. 16, 2023.

*Primary Examiner* — Christopher P Schwartz
(74) *Attorney, Agent, or Firm* — Harvest IP Law, LLP

(57) ABSTRACT

The invention concerns a brake piston for a vehicle disc brake assembly, the brake piston comprising: an at least partially hollow main body portion extending along a longitudinal axis; an end face portion extending at an angle to the longitudinal axis and having an radially outer annular portion; wherein a circumferentially extending inner groove is provided at an inner surface of the brake piston, wherein an axial distance between the inner groove and the end face portion is between 0% and 25% of the axial length of the brake piston.

13 Claims, 9 Drawing Sheets

(56) References Cited

U.S. PATENT DOCUMENTS

| | | | | |
|---|---|---|---|---|
| 8,348,025 B2* | 1/2013 | Arbesman | ............ | F16D 65/0006 |
| | | | | 188/264 G |
| 9,151,385 B2* | 10/2015 | Winkler | ................... | F16J 1/006 |
| 10,247,269 B2* | 4/2019 | Iwai | ......................... | B21H 1/00 |
| 2013/0037357 A1 | 2/2013 | Cornolti | | |

FOREIGN PATENT DOCUMENTS

| | | |
|---|---|---|
| DE | 19603586 A1 | 8/1997 |
| DE | 202004014009 U1 | 12/2004 |
| DE | 102007051456 A1 | 4/2009 |
| DE | 112015003522 T5 | 4/2017 |
| EP | 2350489 B1 | 8/2013 |
| EP | 2944840 A1 | 11/2015 |
| JP | 5328925 B2 | 10/2013 |
| WO | 2019-118289 A1 | 6/2019 |

\* cited by examiner

BRAKE PISTON FOR A VEHICLE DISC BRAKE ASSEMBLY HAVING INNER GROOVE FOR STRUCTURAL NOISE DAMPENING

CROSS-REFERENCE TO RELATED APPLICATION

This application is based on and claims priority under 35 U.S.C. § 119 to German Patent Application No. 102022202471.0, filed on Mar. 11, 2022 in the German Patent and Trade Mark Office, the disclosures of which are incorporated herein by reference.

TECHNICAL FIELD

The invention relates to a brake piston for a vehicle disc brake assembly and a brake caliper arrangement comprising a respective brake piston. The vehicle may in particular be a road vehicle, such as a car, a truck or a bus.

BACKGROUND

Brake pistons are displaceable members received in a brake caliper and acting on a brake pad to activate and deactivate a brake. It is known that the interaction of the brake piston and the brake pad may, for various reasons, cause vibrations and noise, such as squeal noise. This may be undesired for reasons of brake performance and passenger comfort. Typical causes of vibration and noise may be high friction forces and relative movements between the brake piston and brake pad.

More precisely, squeal noises may appear due to friction between the brake pads and brake disc which causes other parts of brake and axle systems start to vibrate. Under certain conditions (extent of friction, applied brake pressure, temperature) the whole brake system is going to vibrate at certain frequencies which are close to each other, but in different directions. These modes of vibration may combine to generate a complex mode (unstable mode). Especially the vibration of components with large surfaces at such complex modes, e.g. the brake disc and caliper, may lead to a generation and spreading of undesired acoustic waves (squeal).

Even more precisely, a typical source of such noises can be explained as follows: At certain brake loads, the physical parameters within the brake components change, in particular the friction coefficient between the lining and the disc may increase. As a function of the increasing friction and of environmental conditions (temperature, humidity, speed, . . . ), a particular flutter vibration occurs within the disc brake assembly which can be stable or unstable. Components of the vehicle brake assembly that move relative to each other begin to flutter (e.g. in normal and tangential directions). This phenomenon leads to at least two vibration modes of the entire disc brake assembly that are pushed to the same frequency, so that a flutter instability arises. A self-excited vibration due to the high-grade non-linear friction between the brake pads and the brake disc increases said flutter instability. The adjacent vibration modes become closer with the increasing friction coefficient and may be merged (interact) due to the frequency uniformity. This is known as mode coupling in which two or more system modes oscillate at nearly equal frequencies, but at different phases. Through this interaction of modes, energy is provided at the friction interface at each oscillation period between two or more components of the disc brake assembly. This energy exchange at the interfaces leads to unstable or complex oscillation which when reaching a sufficiently large amplitude is unpleasantly recorded as squeaking noise.

To limit such noise, it is known to provide so-called shims that are arranged between an end face of the brake piston facing the brake pad and the brake pad. A respective example can be found in U.S. Pat. No. 8,348,025 B2. Such shims serve to dampen the transmission of vibrations from the brake pads onto the brake caliper and onto the further components connected thereto.

Other measures e.g. include providing chamfers or slots within a friction material of the brake pads, adapting an underlayer provided between the friction material and backplate of a brake pad or adding mass to components prone to vibration.

While these solutions may help to limit noise and vibrations to some degree, there is still room for improvement. Also, providing an additional shim increases costs and complexity.

SUMMARY

It is therefore an object of this invention to provide a brake piston and brake caliper arrangement that helps to limit noise and vibrations when acting on a brake pad during braking.

This object is solved by the independent claims of this disclosure. Advantageous embodiments are set out in the dependent claims and in this description.

Accordingly, a brake piston for a vehicle disc brake assembly is disclosed, the brake piston comprising:
  an at least partially hollow main body portion extending along a longitudinal axis;
  an end face portion extending at an angle to the longitudinal axis and having a radially outer annular portion and in particular an open central portion;
  a circumferentially extending inner groove that is provided at an inner surface of the brake piston,
wherein an axial distance between the inner groove and the end face portion is between 0% and 25% of the axial length of the brake piston.

By providing the inner groove, a structure of brake piston is deliberately altered and in particular locally weakened so as to have desired vibration characteristics. Accordingly, a hard contact between the piston and brake pad may be avoided by providing a brake piston with a locally increased structural resilience (locally meaning in the region of the inner groove).

More specifically, the annular groove enables the brake piston to structurally dampen vibrations which result from acting on the brake pad during braking. It has been determined that by locally increasing the vibration capability of the brake piston in this manner, the extent of structural vibrations that are transmitted to further components can be reduced. For example, in the region of the inner groove the brake piston may dissipate at least part of the structural vibrations transmitted to the brake piston and in particular to its end face portion during braking. This may be achieved by the brake piston's elastic deform-ability being locally increased in said region of the inner groove and thus increased adjacent to or directly at the end face.

The main body portion may be cylindrical. It may have a circular cross-section. It may extend concentrically to the longitudinal axis. The cross-section may be continuous along the longitudinal axis. The main body portion may have at least one inner cylindrical hollow section. Said section may e.g. extend axially and in particular from the end face towards an opposite end of the main body portion.

The main body portion may have at least one closed surface extending at an angle to the longitudinal axis, e.g. a closed base surface at an axially opposite end to the end face portion. The hollow portion may provide weight savings, whereas the closed surface may provide a hydraulic sealing or hydraulic separation between a cavity in which the brake piston is received and the surroundings. Also, the hollow portion may allow to receive further components in the brake piston, such as at least part of an electric parking brake actuator.

The end face may extend perpendicular to the longitudinal axis. It may generally be planar and/or smooth apart from below discussed optional recesses. It may be configured to contact the brake pad during braking or at least rest against said brake pad and e.g. contact an intermediate member.

The annular portion may extend concentrically about the rotational axis. The annual portion may merge with edge portion or, in other words, with an axial end of the main body portion. A radial dimension and in particular to an outer diameter of the annual portion may be equivalent to a diameter and in particular an outer diameter of the main body portion. The annular portion may extend radially inwards from said outer diameter.

For example, the end face portion and in particular its annual portion may form or comprise a radially inward protruding portion. Said portion may e.g. protrude relative to the inner surface and/or to a cylinder wall portion of the main body portion.

An inner diameter of the annular portion may be at least 10% or at least 20% smaller than the outer diameter. The inner diameter may form an edge or circumference of the optional open central portion. The open central portion may extend concentrically with respect to the longitudinal axis and/or the annular portion. The open central portion may comprise or be a through hole. A hollow part of the main body portion may be accessible via said open central portion.

The open central portion, the annular portion and/or the main body portion may have a similar cross-sectional shape, in a particular a circular shape.

If no open central portion is provided, the central portion may be closed. The annular portion may seamlessly (e.g. without steps) merge into said central portion.

The inner groove may form at least a section of a ring. It may form a radial indentation in the inner surface. The groove may extend along a circumferential direction. The inner surface may extend concentrical to the longitudinal axis and/or to an outer surface of the main body portion. It may have a similar cross-sectional shape as the outer surface, in particular a circular one.

In case of a 0% axial distance from the end face portion, the inner groove may axially overlap with the end face and in particular with an inner surface thereof. Put differently, the inner groove may at least partially extend into said end face portion. This proximity of the inner groove to the end face portion and in particular its optional overlap therewith may provide a particularly efficient vibration dampening effect.

In case of a larger axial distance between the inner groove and end face, a significant vibration dampening effect may still be achieved. Yet, structural rigidity may be increased. Thus, depending on a desired extent of vibration dampening compared to a desired extent of structural rigidity, the axial distance set to be closer of farther away from the end face portion.

According to an embodiment, the groove forms a continuous ring. This increases the dampening effect and may simplify production, e.g. compared to the groove comprising or being formed as a plurality of adjacent ring-segments (which nonetheless may equally be provided).

In one example, the inner groove is at least partially comprised by the main body portion and/or by a transition region between the main body portion and the end face portion. This may be equivalent to the inner groove and the end face portion at least partially overlapping one another.

According to a preferred embodiment, the main body portion has at least one outer recess on its outer surface. This recess may be a groove, in particular a circumferentially extending groove and/or a ring shaped groove. The outer recess may be a seal seat. For example, the outer recess may be configured to receive an O-ring. The brake piston disclosed herein may comprise a respective seal and in particular O-ring that is received in said outer recess. By means of such a seal, a reliable hydraulic sealing between the brake piston and a cavity receiving said brake piston may be achieved.

The inner groove may axially overlap said outer recess. This may be particularly efficient for locally (i.e. in the region of said overlap) increasing the structural vibration dampening capabilities of the brake piston. Alternatively, the inner groove may be axially spaced apart from the outer recess by not more than 10% of the axial length of the brake piston. This may still provide a significant local increase of the vibration dampening capabilities while achieving a larger rigidity compared to the axial overlap.

The inner groove may have a rounded and in particular a half-circular or arc-shaped cross-sectional profile. Put differently, it may be free of sharp edges and/or may have a smooth surface free of local diameter steps. This limits a risk of mechanical stresses which concentrate at the inner groove leading to structural damages (e.g. to tears or cracks). The cross-sectional profile may be defined in a cross-sectional plane that comprises the longitudinal axis. It may extend orthogonally to a circumferential direction.

According to a further example, the end face and in particular its annular portion comprises a plurality of recesses. The recesses may define an axial indentation. The recesses may be elongated (e.g. in a circumferential direction). The recesses may be distributed in a circumferential direction. There may be annular arrangements of recesses, said annular arrangements having different diameters (e.g. an inner annular arrangement and an outer annular arrangement). The annular arrangements may be concentric.

Distances between adjacent recesses in a circumferential direction (i.e. angular distances) may be constant. An irregular circumferential spacing is, how-ever, equally possible. According to one embodiment, a regular angular distance is provided between the recesses. For example, an angular spacing of 15° may be provided, thus providing twenty four positions having a recess.

The recesses may be produced jointly with the annular portion and/or the overall brake piston. For example, they may be directly produced when casting or die forging the annular portion and/or the overall brake piston.

The brake piston may generally be a one-piece member, in particular made from a metallic material (e.g. cast iron or aluminium) or a plastic material.

At least some of the recesses may have an elliptic footprint or, in other words, an elliptic outline or shape. This may concern a shape in a surface and/or plane of the annular portion.

Additionally or alternatively, at least some of the recesses may have a rectangular outline or footprint. A longer side of said outline or footprint may extend along a radial direction. A shorter side may extend along a circumferential direction. Put differently, the rectangular recess may be oriented so that their longer sides substantially extend radially.

Additionally or alternatively, at least some of the recesses may have a rectangular footprint with a longer side of said footprint extending along a circumferential direction. A shorter side may extend along a radial direction.

The terms axial, radial and circumferential as used herein may generally relate to the longitudinal axis, with axial defining an orientation along said axis, radial an extension orthogonally to said axis and circumferential an extension about said axis.

In a further example, the annular portion comprises different recess shapes, in particular a mix of any of the types of recesses described above.

By providing the recesses, contact forces and in particular friction forces occurring at the end face when contacting a brake pad may be reduced. This can limit an extent of generated friction forces and thus of vibrations that could propagate through the brake piston and adjacent structures. It has been determined that the recess shapes, arrangements and their combinations disclosed herein are particularly efficient in this context.

In one example, at least one of the recesses is at least partially filled with a material that is different from a material of the piston main body. Specifically, a noise and/or vibration dampening material may be used for this purpose. Said material may e.g. be or comprise a rubber material, a foam material or generally an elastic material (e.g. being at least twice or at least ten times as elastic as a material of the piston main body, the elasticity being e.g. defined by an E-modulus). There may also be a combination of filled recesses and non-filled recesses, e.g. to save weight and costs. The piston may e.g. be made of a metal or hard plastic.

Additionally or alternatively, the inner groove may at least partially be filled with a material of the above kind. For example, a continuous ring of said material may extend in and along said groove. This likewise increases vibration dampening.

In one example, at least part of a surface of the annular portion (in particular the surface facing the brake pad) may be covered with a material of the above kind. This may relate to a surface in which the recesses are provided, so that spaces and/or surface portions in between said recesses may be covered by a respective material. Again, this may help to limit friction forces.

In a further example, the annular portion comprises a plurality of axial protrusions. The protrusions may be shaped and arranged similar to any embodiments of shaping and arranging recesses disclosed herein. For example, they may have a rectangular or elliptic outline. Additionally or alternatively, the may be regularly spaced around the annular portion's circumference, e.g. at angular distances of 15°. Again, the protrusions may be integrally formed with the annular portion and/or the brake piston. They may be directly formed when producing the brake piston, e.g. directly during casting or forging. Alternatively, the The protrusion may form local projections of limited dimensions compared to a surrounding axial surface level of the annular portion. The axial surface level may correspond an axially innermost or lowest level of the annular portion.

The above-discussed recesses, on the other hand, may form local indentations of limited dimensions compared to a surrounding axial surface level of the annular portion. The axial surface level may correspond an axially outermost or highest level of the annular portion.

The surrounding axial surface level of the annular portion may coincide with an axial level of an edge in which the annular portion merges with a cylindric wall portion of the main body portion.

In a further example, at least one elongated groove is provided in the annular portion. Said groove may extend along the circumferential direction and e.g. cover significantly larger angular distances as the above-discussed recess. It define a continuous or closed ring. This groove may provide weight savings, but at the same time may provide effects similar to the optional (local) recesses.

The annular portion may comprise any combination of projections, recess and grooves according to any the respective variants of these features discussed herein.

The invention also relates to a brake caliper arrangement for a vehicle disc brake assembly, the brake caliper arrangement comprising a brake caliper having a cavity in which a brake piston according to any of aspects disclosed herein is provided.

BRIEF DESCRIPTION OF DRAWINGS

Embodiments of the invention are described below with respect to the schematic figures of this disclosure. Same features may be marked with same reference signs throughout the figures.

DETAILED DESCRIPTION

Figure 1:
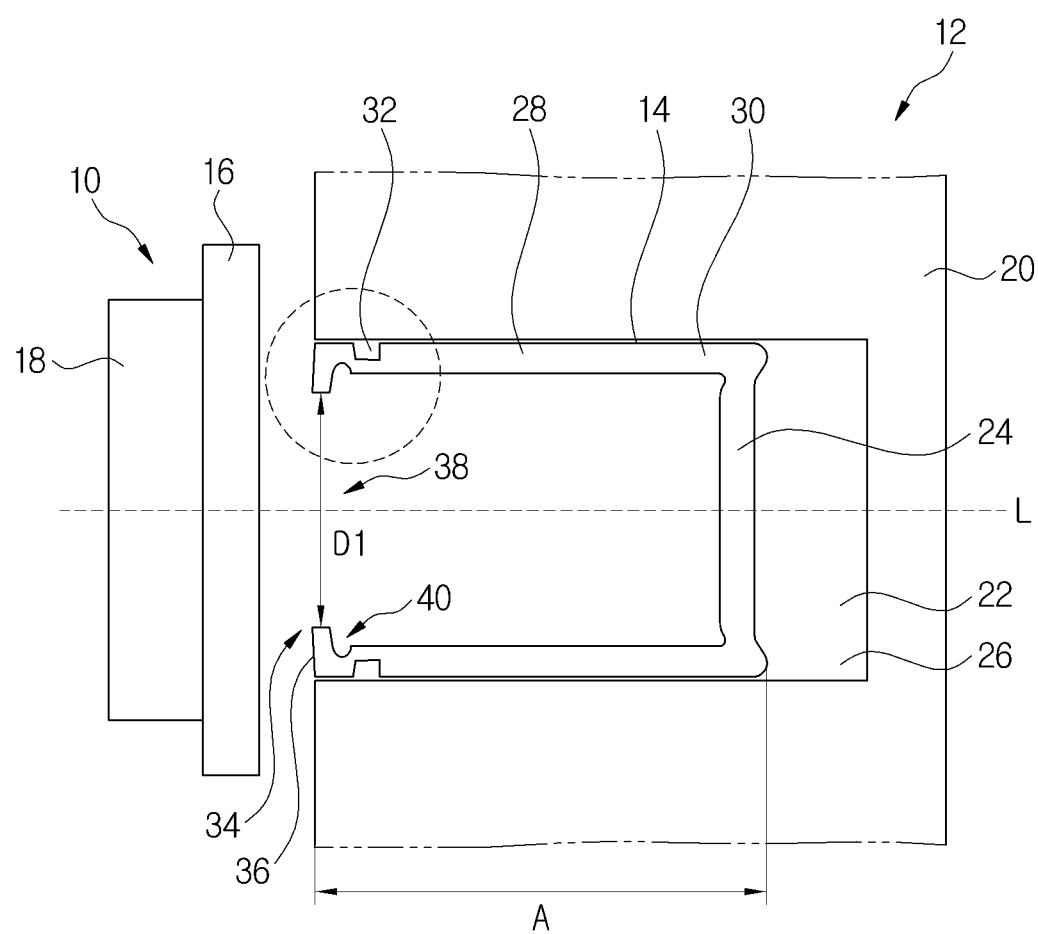
FIG. 1 is a cross-sectional view of a brake pad and part of a brake caliper arrangement, the brake caliper arrangement comprising a brake piston according an embodiment of the invention.

FIG. 1 is a cross-sectional view of a brake pad 10 and of part of a brake caliper arrangement 12, the brake caliper arrangement 12 comprising a brake piston 14 according to embodiment of the invention. The brake pad 10 and the brake caliper arrangement 12 are configured according to the prior art. The sectional plane comprises a longitudinal axis L of the brake piston 10.

The brake pad 10 comprises a back plate 16 and a friction material 18. The friction material 18 faces a non-illustrated brake disc and is configured to generate brake forces when contacting said brake disc.

The brake caliper arrangement 12 comprises a caliper 20 that is only partially illustrated. It may be a floating caliper according to existing solutions, but can equally be provides as a fixed caliper. The caliper 20 comprises a cylindric and elongated recess 22 in which the brake piston 14 is received. A closed base surface 24 of the brake piston 14 and the walls of the recess 22 delimits a hydraulic chamber 26. In a generally known manner, a hydraulic pressure within said hydraulic chamber 26 can be altered to move the brake piston 14 along the longitudinal axis L. As a result of this movement, the brake piston 14 can press the brake pad 10 into contact with the non-illustrated brake disc (when moving to the left in FIG. 1) or release said pressure (when moving to the right in FIG. 1) to activate and deactivate the brake, respectively.

The brake piston 14 is configured as a hollow cylindrical member. Even though not depicted, the brake piston 14 could receive an electric brake actuator that e.g. provides an electric parking brake function. It comprises a main body portion 28 having a circular cross-section and extending concentrically with respect to the longitudinal axis L. The main body portion 28 comprises a cylindric wall portion 30 (e.g. comprising a shell or mantle surface of the cylinder) and further comprises the closed base surface 24. At the outer surface of the cylindrical wall portion 30, it comprises an outer ring-shaped circumferential groove 32. This outer groove 32 acts as a seat for receiving a hydraulic seal, such as an O-ring (not illustrated).

The outer groove 32 is positioned close to an axial end of the brake piston 14, said end being opposite to the axial end facing the hydraulic chamber 26. It comprises the below discussed end face portion 34. In the shown example, said axial end at which the outer groove 32 is positioned is remote from the base surface 24. An axial distance between the outer groove 32 and said adjacent axial end (that is remote form the optional base surface 24) of the brake piston 14 may be less than 20% and in particular less than 10% of the axial length A of the brake piston 14. Note that this position of the outer groove 32 is not limited to the depicted example and may be a general feature of any embodiment of the invention comprising a respective outer groove 32.

The end of the brake piston 14 remote from the base surface 24 comprises an end face portion 34. The end face portion 34 extends radially and thus at an angle to the cylindric wall portion 30. For example, it may extend substantially orthogonally to the cylindric wall portion 30 and thus to the longitudinal axis L. The outer face of the end face portion 34 facing the brake pad 10 is formed by an annular portion 36. Said annular portion 36 forms a closed ring-shaped surface whose inner diameter D1 confines and open central portion 38. Put differently, the open central portion 38 may define an aperture through which the inner volume and thus the hollow interior of the brake piston 14 is accessible.

At an inner surface of the brake piston 14 and, at least in the shown example, in a transition region between the cylindric wall portion 30 and the end face portion 34, an inner groove 40 is provided. Said groove 40 extends circumferentially and forms a closed continuous ring. It axially overlaps with the outer groove 32. Also, it merges with the radially inward protruding section of the end face portion 34.

Figure 2:
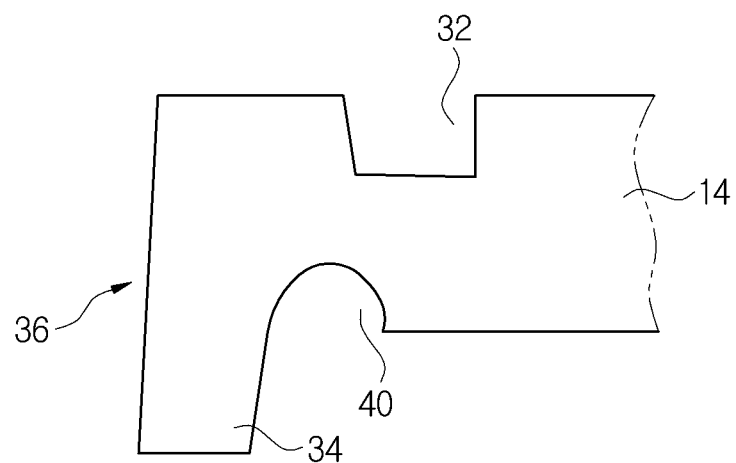
FIG. 2 is a detail view of a brake piston of FIG. 1.

This is further evident from the detail view of FIG. 2, showing an enlarged view of the brake piston's encircled portion in FIG. 1. Again, one can see that the axial position of the inner groove 40 and the axial position of the outer groove 32 overlap. Also, an inner side of the radially inward protruding section of the end face portion 36 merges with the inner groove 40.

As a result, a material strength (and in particular radial material thickness) is locally reduced in the region of the annular groove 40 and in particular in the region of an axial overlap between the annular groove 40 and the outer groove 32. Note that a significant reduction of the material strength could also be achieved without providing the optional outer groove 32.

Further, FIG. 1 shows that the cross-sectional profile of the annular groove is rounded and in particular arc-shaped. This improves a distribution and in particular a flow of mechanical stresses within and through the brake piston 14. As a result, a risk of cracks or tears is reduced, while a deliberate structural resilience is still provided by the annular groove 40.

Specifically, when pressing the brake pad 10 against the non-illustrated brake disc, significant frictional forces and/or vibrations may occur. These are transmitted to the brake piston 14. Yet, due to the structural resilience in the region of the annular groove 40, said vibrations are at least partially structurally dampened by the brake piston 14.

For example, a mechanical energy of said vibrations can at least partially be dissipated by a local elastic deformation of the brake piston 14 in the region of the annular groove 40. This limits the extent of vibrations that could be transmitted by the brake piston 14 to the brake caliper 20 and to further vehicle components connected thereto. Thus, a generation of noise during braking can be reduced, in particular of squeal noises.

Figure 3:
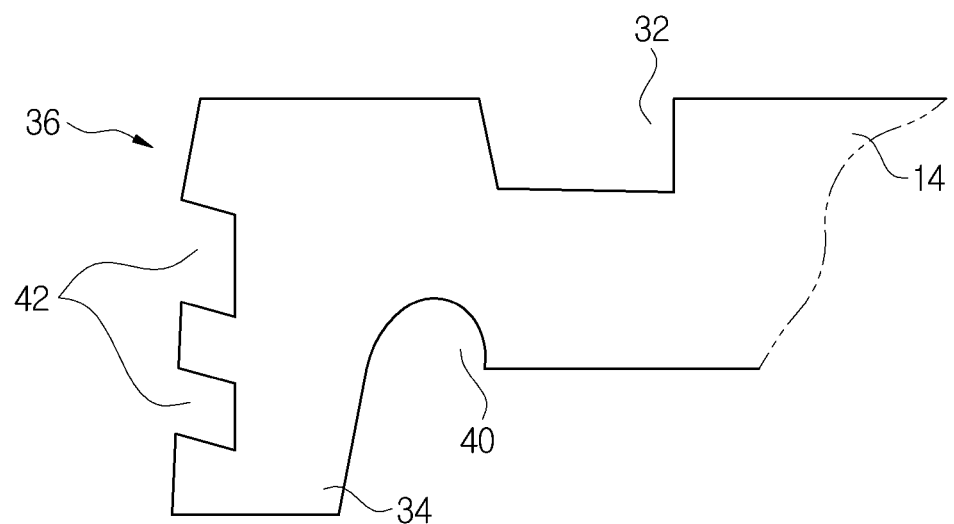
FIG. 3 is a detail view of a brake piston according to another embodiment of the invention.
Figure 4:
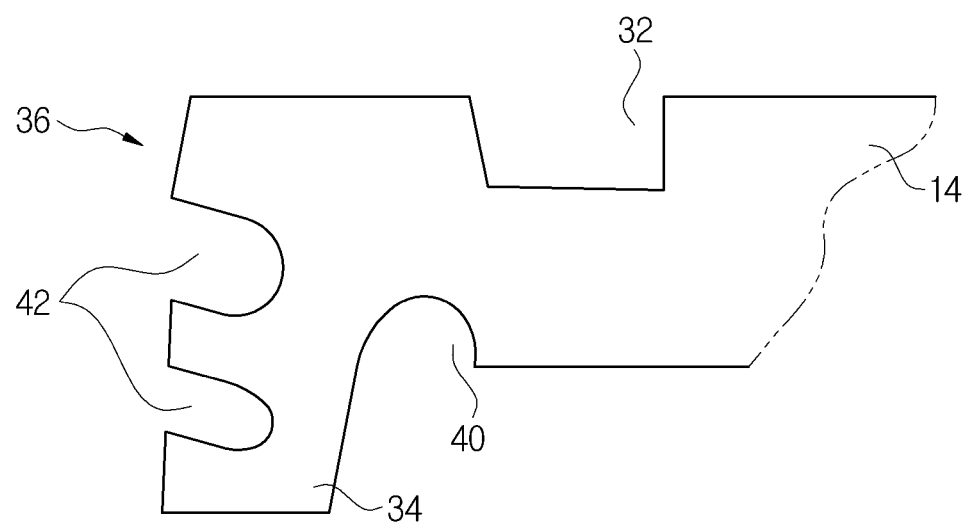
FIG. 4 is a detail view of a brake piston according to another embodiment of the invention.

FIGS. 3 and 4 show detail views similar to FIG. 2. In these cases, the annular portion 36 is not completely smooth and planar as in the previous embodiment, but comprises recesses 42. The recesses 42 define axial indentations. In case of FIG. 3, the recesses 42 have a substantially rectangular cross-sectional profile which may improve compactness and may be simple to manufacture.

In case of FIG. 4, at least a bottom surface of the recesses 42 has a rounded and in particular an arc-shaped cross-sectional profile. Similar to the rounded cross-sectional profile of the annular groove 40, this prevents sharp edges and limits an associated risk of cracks and tears forming under load. The plurality of recesses 42 that are positioned radially above one another in FIGS. 3 and 4 is only by way of example. It is equally considered to provide only one such recess 42 in per circumferential section of the annular portion 36.

It may be provided that the recesses 42 extend as a continuous ring along the annular portion 36 or as ring segments having a length of e.g. not more than 10% or not more than 20% of a circumference of the annular portion 36.

Figure 5:
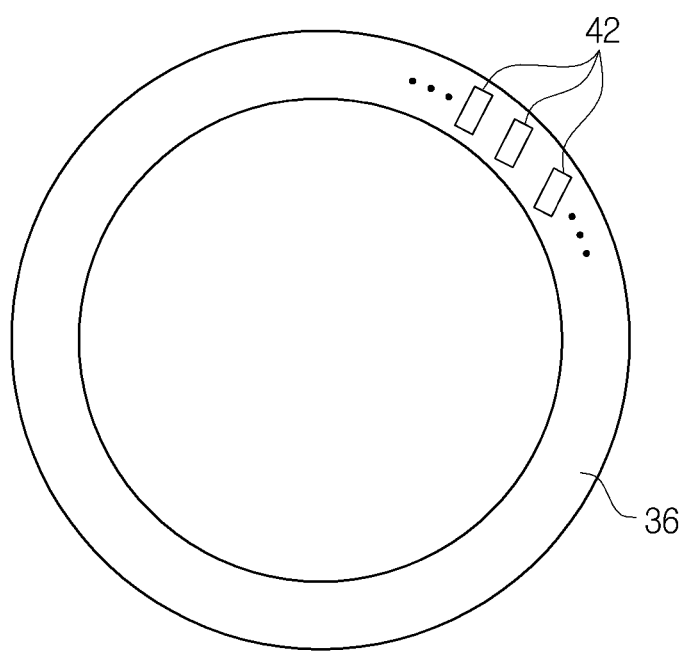
FIG. 5 is a frontal view of an end face of a brake piston according to another embodiment of the invention, the end face comprising radially oriented rectangular recesses.
Figure 6:
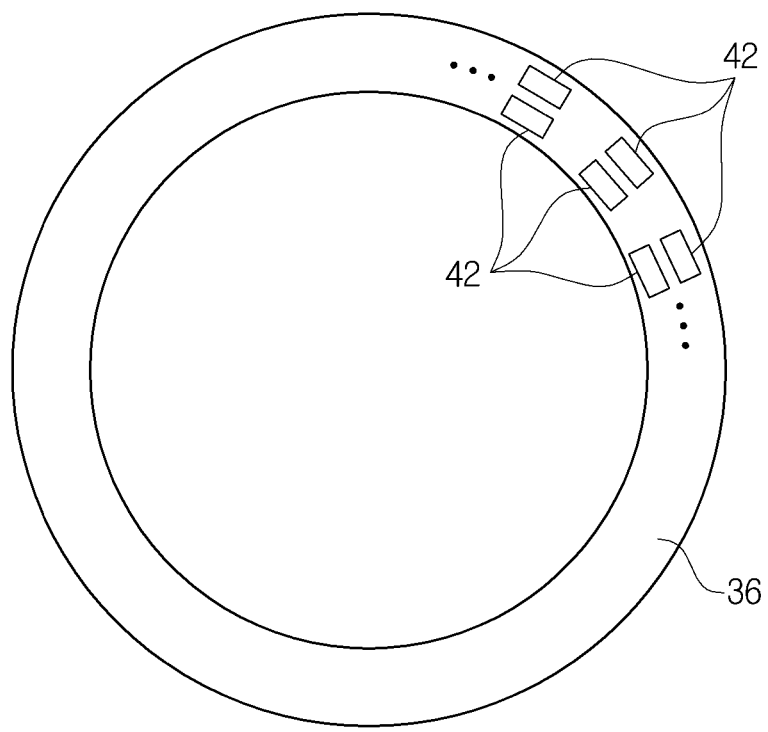
FIG. 6 is a frontal view of an end face of a brake piston according to another embodiment of the invention, the end face comprising circumferentially oriented rectangular recesses.
Figure 7:
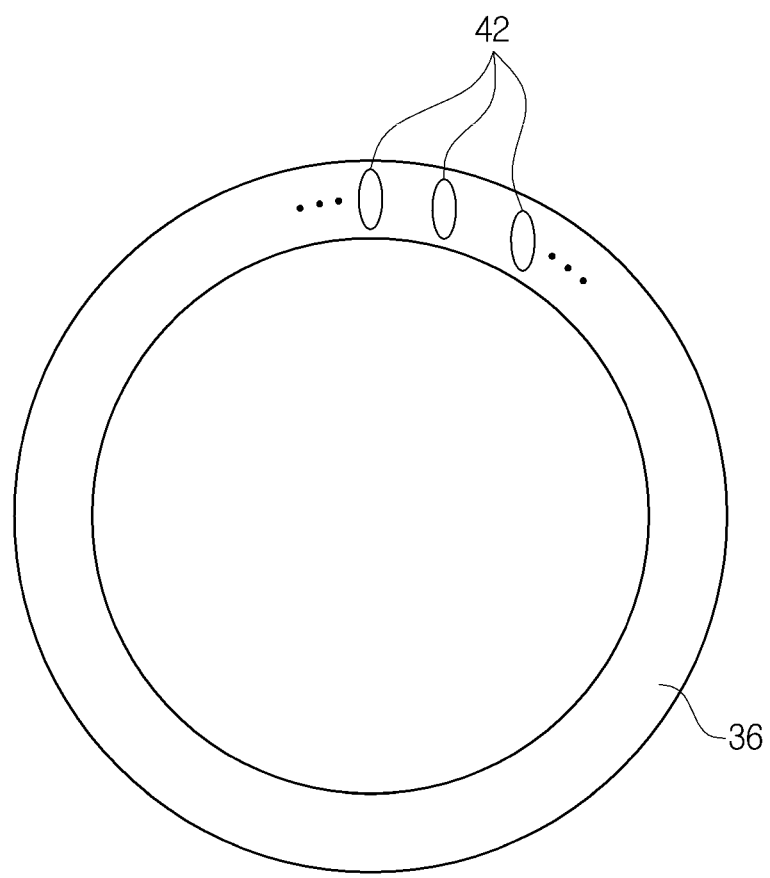
FIG. 7 is a frontal view of an end face of a brake piston according to another embodiment of the invention, the end face comprising elliptic recesses.

FIGS. 5-7 show embodiments in which the recesses 42 have limited circumferential extension and are generally provided as local axial indentations.

In case of FIG. 5, the recesses 42 are rectangular, with a longer of side of the rectangular outline being oriented substantially radially.

In FIG. 6, the recesses 42 are again rectangular. Yet, the longer sides are substantially circumferentially oriented. Only by way of example, the recesses 42 are radially positioned above one another. It may also be provided that only one recess 42 is present in each circumferential section of the annular portion 36.

In FIG. 7, the recesses 42 have an elliptic shape. Only by way of example, a longer elliptic axis extends radially, but could also extend circumferentially.

As schematically indicated by dots in FIGS. 5-7, the recesses 42 (or pairs of recesses 42 as in FIG. 6), may be distributed along the complete circumference of the annular portion 36. In particular, they may be distributed regularly with constant circumferential distances between one another. This helps to provide a uniform structural dampening effect across the complete surface of the annular portion 36.

The recesses 42 in the annular portion 36 also provide a certain structural resilience, thus limiting a hard contact between the brake piston 14 and brake pad 10. Also, they may help to limit frictional forces between the annular portion 36 and the brake pad 10. Thus, they may generally contribute to limiting noise and vibrations during braking.

Although not specifically illustrated in the figures, any of the inner groove 40 or optional recesses 42 may be partially be filled with a resilient material, such as a rubber material and/or a foam material. This may provide an additional noise and/or vibration dampening effect. Also, the surface of the annular portion 36 facing the viewer in FIGS. 5-7 may at least partially be covered with a non-metallic material, in particular with a rubber and/or plastic material. This may help to limit a generation of frictional forces between the piston 14 and brake pad 10.

Figure 8:
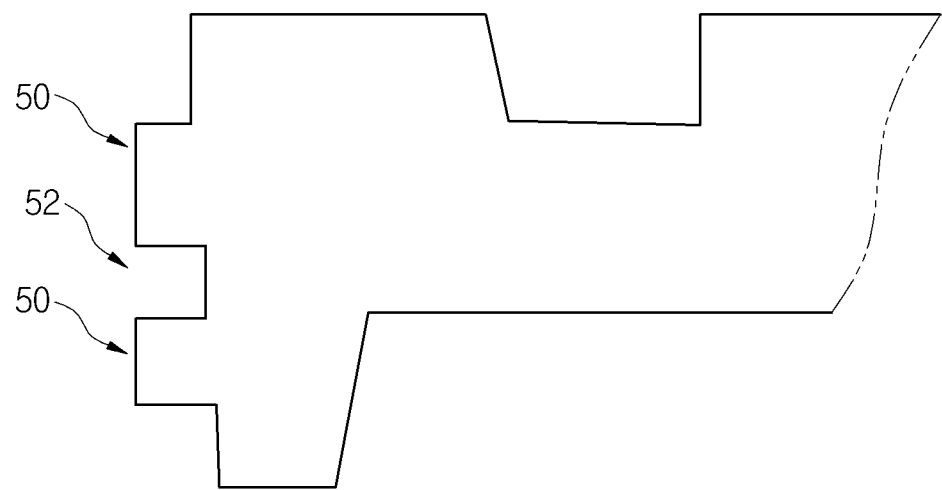
FIG. 8 is a detail view of a brake piston according to another embodiment of the invention.
Figure 9:
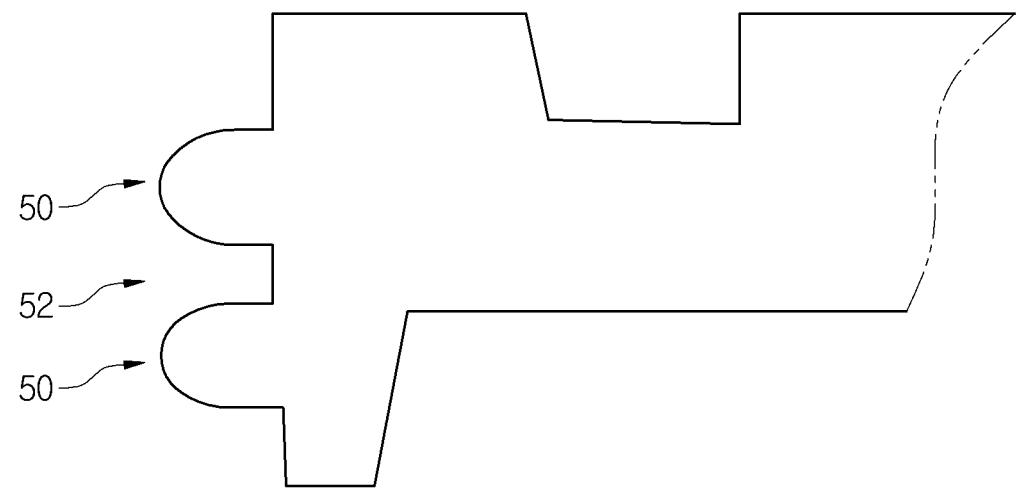
FIG. 9 is a detail view of a brake piston according to another embodiment of the invention.

FIGS. 8 and 9 are detail views similar to FIGS. 2, 3 and 4. FIGS. 8 and 9 each show other structural features provided in the annular portion 36, such as an elongated groove 52 (in particular extending circumferentially or defining a closed ring). Also, axial projections 50 are shown. By way of example, two radially stacked projections 50 are shown, but there may only be one projection 50 in each circumferential section as well. Also, there may be only one of the groove 52 and projections(s) 50 instead of the depicted combination.

In FIG. 8, the projections are rectangularly shaped, whereas in FIG. 9 they are rounded. The effects resulting from these shapes are the same as the ones of the rectangular and rounded recesses 22 discussed in connection with FIGS. 3 and 4.

What is claimed is:

1. A brake piston for a vehicle disc brake assembly, the brake piston comprising:
    an at least partially hollow main body portion extending along a longitudinal axis; and
    an end face portion extending at an angle to the longitudinal axis and having a radially outer annular portion,
    wherein a surface of the annular portion facing a brake pad has a plurality of axial recesses an axial thickness of the annular portion decreases or a plurality of axial projections such that the axial thickness of the annular portion increases, so as to provide structural resilience.

2. The brake piston according to claim 1, the brake piston further comprising a circumferentially extending inner groove that is provided at an inner surface of the brake piston.

3. The brake piston according to claim 2,
    wherein the inner groove is at least partially comprised by the main body portion or by a transition region between the main body portion and the end face portion.

4. The brake piston according to claim 2,
    wherein the main body portion has at least one outer recess on its outer surface and the inner groove axially overlaps with said outer recess or is axially spaced apart therefrom by not more than 10% of an axial length of the brake piston.

5. The brake piston according to claim 2,
    wherein the inner groove has a rounded the cross-section profile.

6. The brake piston according to claim 2,
    wherein the inner groove forms a continuous ring.

7. The brake piston according to claim 6, wherein an axial distance between the inner groove and the end face portion is between 0% and 25% of an axial length of the brake piston.

8. The brake piston according to claim 2,
    wherein a material that is different from a material of the piston main body is provided according to at least one of the following:
    at least one of the plurality of axial recesses is at least partially filled with said material;
    the inner groove is at least partially filled with said material;
    at least part of the surface of the annular portion is covered with said material.

9. The brake piston according to claim 1,
    wherein at least some of the plurality of axial recesses have a rectangular outline with a longer side of said outline extending along a circumferential direction.

10. The brake piston according to claim 1,
    wherein the plurality of axial recesses include recesses of different shapes.

11. The brake piston according to claim 1,
    wherein at least some of the plurality of axial recesses have an elliptic outline.

12. The brake piston according to claim 1,
    wherein at least some of the plurality of axial recesses have a rectangular outline with a longer side of said outline extending along a radial direction.

13. Brake caliper arrangement for a vehicle disc brake assembly, the brake caliper arrangement comprising a brake caliper having a cavity in which a brake piston according to claim 1 is received.

* * * * *